United States Patent Office 2,958,757
Patented Nov. 1, 1960

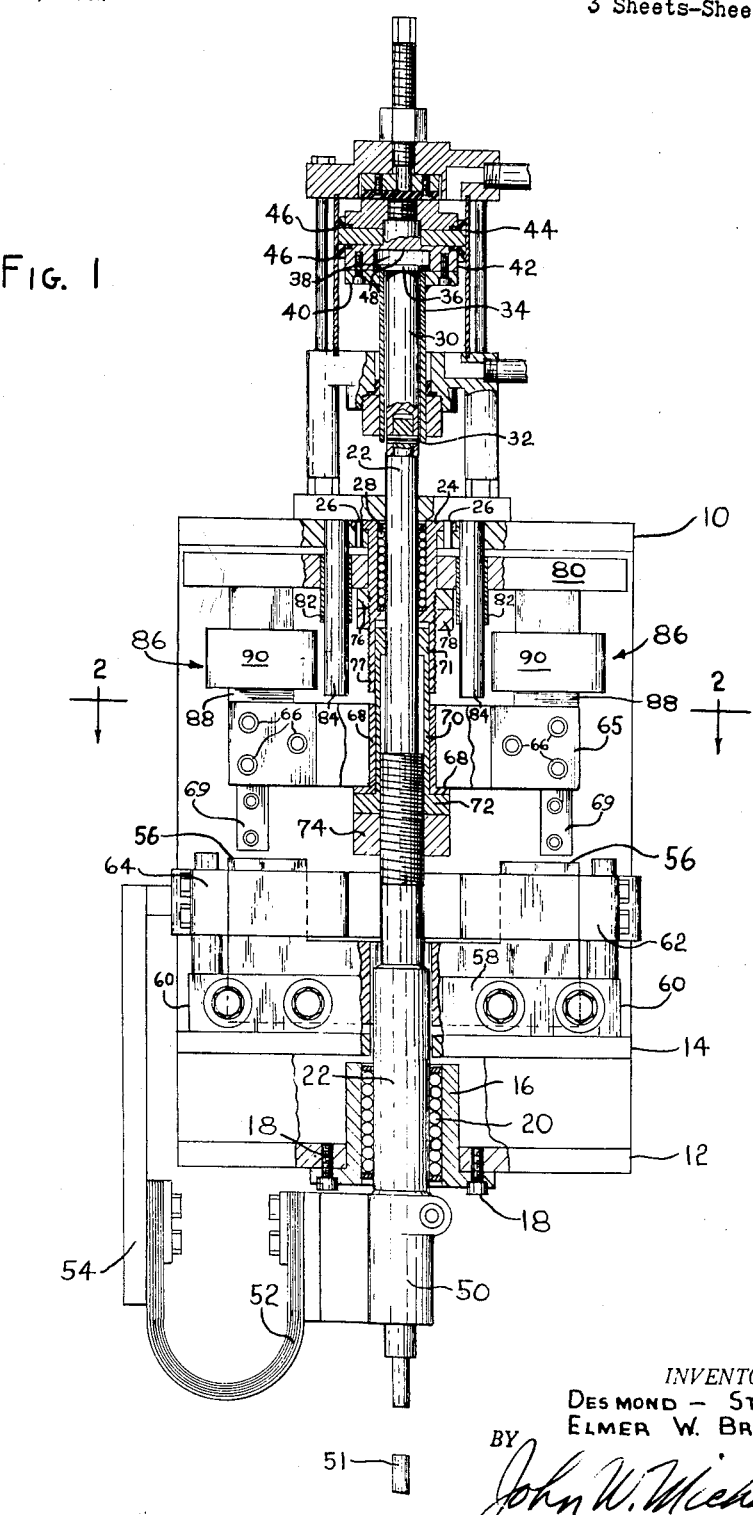

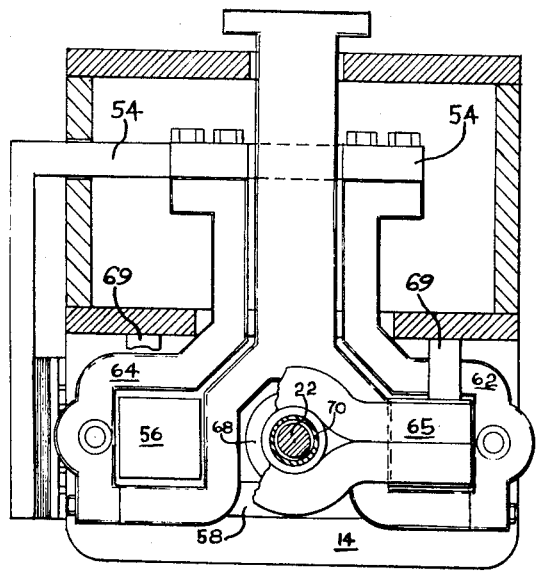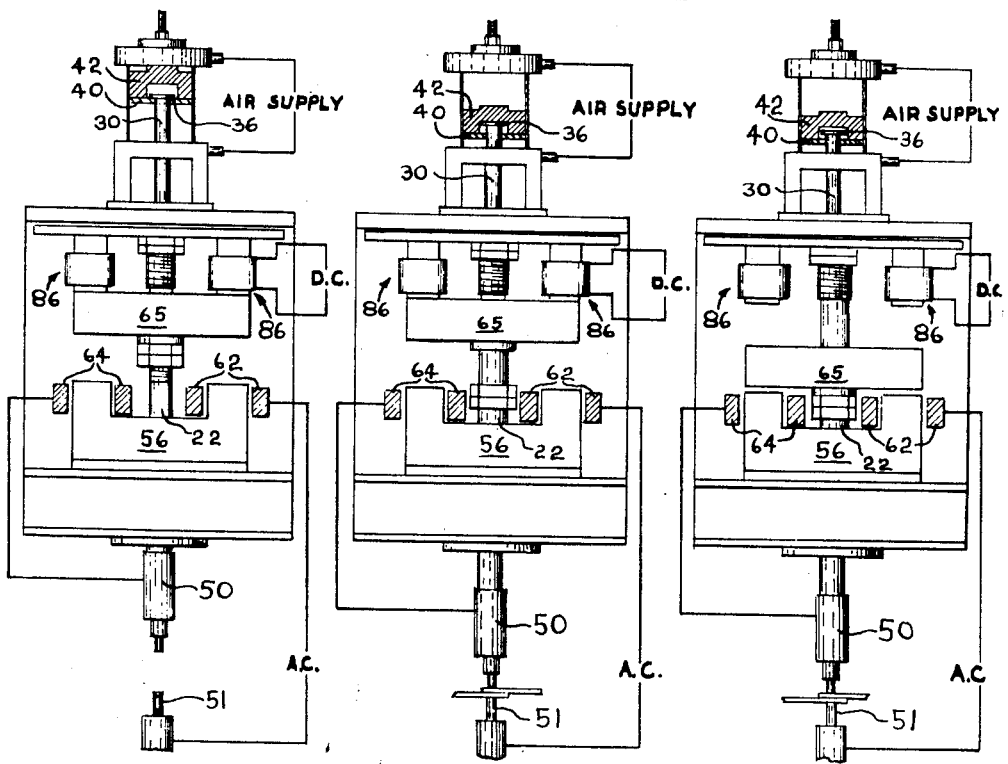

2,958,757

MAGNETIC FORCE WELDING MACHINE

Desmond Stolz, Milwaukee, and Elmer W. Bruss, West Allis, Wis., assignors to Acro Welder Mfg. Co., Milwaukee, Wis., a corporation of Wisconsin Filed July 22, 1957, Ser. No. 673,466

9 Claims. (Cl. 219—86)

This invention relates to a resistance welding machine of the type employing magnetic force for obtaining a supplementary pressure or forging force on the electrodes during the welding operation.

The principal object of this invention is to improve upon the ability of a resistance welding machine of the type described to maintain the desired electrode pressure during the welding operation.

Another object of this invention is to modify resistance welding machines of the type described to provide improved following action on the spindle or the moving electrode during the welding operation.

Throughout the development of this art, the usual design has pretty well standardized on the provision of an air cylinder or ram arrangement for holding the movable electrode on the work and for maintaining pressure between the electrodes during the welding operation. Due to the inherent nature of the air cylinder arrangement, it is virtually impossible to maintain the desired force between the electrodes after the welding operation has been initiated. Since the electrodes tend to reduce the thickness of the work it is necessary to move the movable electrode toward the stationary electrode in order to maintain the desired pressure. With modern technology, the resistance welding machine has evolved into one in which the duration of the welding cycle is extremely short and the inherent inertia of the air cylinder arrangement precludes obtaining the desired follow-up on the movable electrode.

As an improvement upon this arrangement, there has evolved the magnetic force type of resistance welding machine. This type of machine still employs the air cylinder of air ram for achieving the large motion on the electrode and for obtaining the desired initial pressure. However, the air cylinder force is augmented by a magnetic force when current is passed between the electrodes. Since the magnetic follow-up is faster than the air cylinder, the quality of the weld is much improved. The magnetic type still left something to be desired by reason of the force which the magnetic force had to overcome in order to move the electrode.

Wakeley application, Serial Number 633,784, assigned to applicants' assignee, now Patent No. 2,905,804, dated Sept. 22, 1959, provides means for greatly reducing the undesired forces opposing the magnetic action and making possible much faster electrode movement.

The present invention relates to further reduction of the forces opposing the electrode movement. Wakeley provided means for freeing the electrode and the quill carrying the electrode from the air cylinder. The present invention is directed to reduction of the spindle inertia. The spindle in welders of this type has evolved into a long structure to allow the various desirable adjustments to be made. Furthermore, the armature which slides on the spindle must have adequate bearing surface to preclude canting and consequent interference with the desired force and follow-up. Such bearing requirements tended the art towards larger spindle diameters. The greater length and diameter resulted in greater mass and inertia which slowed up the application of the supplementary force. Column action in the long spindle also indicated a heavy spindle construction.

Until Wakeley's invention made possible the elimination of the large retarding force of the air ram the considerations revolving about the spindle mass were unimportant but now become important to solve to realize the full potential of the Wakeley invention. It is in this area that the present invention lies.

Reference has been made to speed of the action and an example may aid in clarifying the problem. Control of the electric energy to the electrodes and magnets has become extremely precise and capable of very short duration. Long ago the electric control surpassed the ability of even the magnetic force machines to follow mechanically and the limit appeared to be at hand. However, with the Wakeley invention and the present invention extremely fast movement of the spindle and electrode is possible so the mechanical action now permits the full potential of the magnetic force theory to be realized. Operating cycles as short as ¼ of one cycle of 60 cycle A.C. current are now possible with this machine. Put another way, this machine can effect a welding operation in 1/240 of one second. With this in mind the magnitude of the problem is better realized.

Other objects and advantages will be pointed out in, or be apparent from, the specification and claims, as will obvious modifications of the single embodiment shown in the drawings in which:

Figure 1 is a front elevation with parts in section to show the construction of the present machine;

Figure 2 is a section in line 2—2 in Figure 1;

Figure 3 is a schematic showing of the machine with the electrode raised;

Figure 4 is similar to Figure 3 but shows the parts (in exaggerated positions) ready for delayed forge welding;

Figure 6:
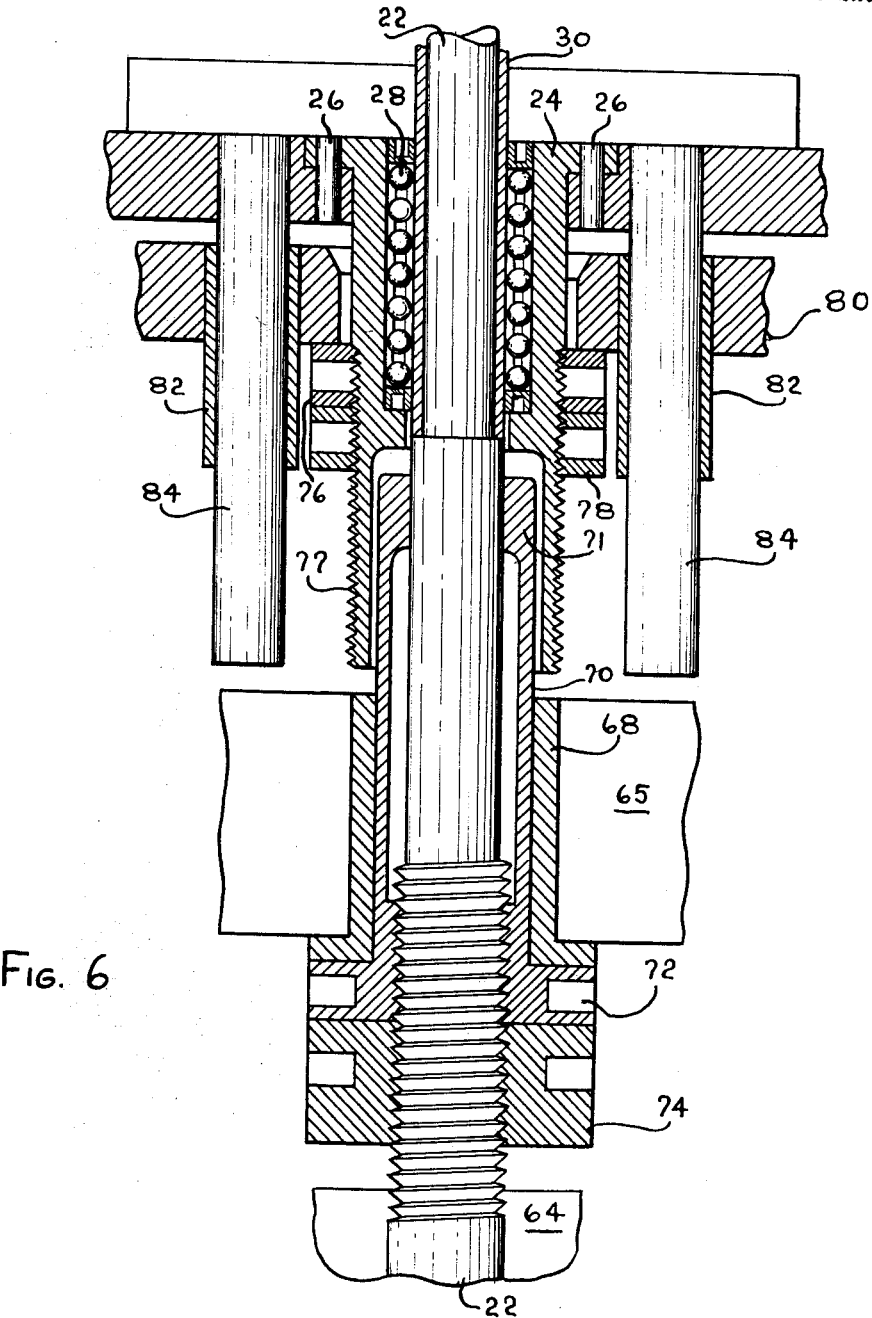

Figure 5 can be considered to be the completion of the forge welding or the end of regular welding; and Figure 6 is an enlarged detail of the quill and the associated adjusting nuts etc.

Referring to the drawings now in detail, the frame of the machine includes upper horizontal plate 10 and a lower bed including parallel horizontal plates 12 and 14. Flanged sleeve 16 is mounted in the lower bed plate 12 by screws 18 and supports linear, or multiple row, ball bearing assembly 20 which guides the lower end of spindle or shaft 22. A similar flanged sleeve or bearing housing 24 is mounted in upper plate 10 by dowel pins 26 and supports linear, or multiple row bearing assembly 28 which guides the upper end of shaft 22. The upper end of shaft 22 is connected to piston rod 30 by spring pin 32. The piston rod projects upwardly centrally of the piston guide 34 and terminates in head 36 which is received in cavity 38 formed by plate 40 secured to piston 42. The piston 42 moves vertically in cylinder 44 as air is admitted either above or below the piston. The piston seal cups 46, 46 must be employed but these inherently incur considerable friction which, as will be pointed out more fully hereinafter, with the present construction is no longer a factor during the welding operation. If air is admitted to the top side of the piston, piston will be moved down but will not actuate the piston rod 30 and spindle or shaft 22 until surface 48 in cavity 38 contacts the top of head 36 (see Figure 4). At this time motion will be transmitted from the piston to the piston rod 30 and thus to spindle 22. If air is then admitted below the piston, the piston will first travel free until head 36 of piston rod 30 is engaged by the upper surface of guide 34 (see Figures 1 and 3). Thus, there is a lost motion at this point. It is this feature which permits the magnetic force to actuate the electrode without having to overcome the friction and inertia of the air ram arrangement. This will be explained more fully hereinafter.

The lower end of spindle or shaft 22 carries electrode 50 which may be of the water cooled type and is provided with a connection through the usual flexible laminated connector 52 to bus bar 54. This is all quite conventional and need not be explained further to understand this invention. It will, of course, be understood that as the air ram moves the spindle 22 up and down the electrode is moved away from or towards the lower fixed electrode 51. Magnet core 56 is clamped on the top of lower bed plate 14 between side clamps 58 and end clamps 60 and is adapted to be energized when the windings 62, 64 around each pole are energized. These windings are actually a single turn of very heavy stock and are preferably water cooled since they are connected in series with the electrodes to be energized when current is passed through the electrodes. This connection comes off the back side of the windings and connects to the bus bar 54. When the current is passed between the electrodes the single winding around each pole of magnet 56 is also energized and the magnet will exert an attracting force on armature 65. This armature is made of two halves connected by the screws 66 and is provided with bushing 68 welded to the armature and adapted to slide on sleeve 70 projecting upwardly from adjusting nut 72 on which the bushing may rest as shown in Figure 1. Sleeve 70 provides a desirable diameter on which bushing 68 may ride in order to guard against canting of the armature on the spindle which would have an adverse effect on the weld quality. Adjusting nut 72 may be adjusted up or down on the shaft to vary the spacing between the armature and the pole faces. It will be appreciated that the magnetic force between the magnet and the armature varies inversely with the square of the distance between the two. In no event is it desirable to have the armature rest on the pole face either before or at the completion of a welding cycle since a that time there would be no force transmitted to the spindle. If the adjusting nut 72 is positioned to place the armature quite close to the pole faces the magnetic force attracting the armature to the magnet would be quite large and this, of course, is transferred to the spindle through bushing 68 contacting the upper surface of adjusting nut 72. Lock nut 74 is provided to hold the adjustment. The armature is retained in alignment with the pole faces by guides 69 fixed on the frame.

It will be noted that upper bearing housing 24 is provided with a depending threaded sleeve portion 77 on which adjusting nut 76 and lock nut 78 are positioned. The adjusting nut varies the position of cross-head 80 which is provided with bushings 82 slidably mounted on guide pins 84 carried by the upper frame plate 10. As the cross-head 80 is moved up or down, the position of the direct current electromagnets 86 is varied with respect to the armature 65. The D.C. magnets have a central core 88 and winding 90. The windings 90 are adapted to be separately energized to obtain a predetermined flux density exerting in turn, a predetermined attractive force on armature 65. With this arrangement, the armature can be lifted on the sleeve portion 70 of the adjusting nut 72 prior to energization of the A.C. magnet during the resistance welding cycle. This is shown on an exaggerated scale in Figure 4 where the gap between the armature and the lower magnet is actually much too great. Since the flux density and the D.C. magnet will give a known attraction force on the armature 65, it is then a simple matter to adjust the D.C. magnets and thus the armature with respect to the A.C. magnet to predetermine the time after the cycle has started at which point the attraction force exerted by the A.C. magnet will overcome the force of attraction of the D.C. magnet and will bring the armature 65 down towards the A.C. magnet to deliver a hammer-like blow through the adjusting nut 72 to the spindle 22 and thus to the electrode. The completion of this action is shown in Figure 5. This type of welding is termed delayed forge welding. It will be appreciated that prior to the delivery of the hammer-like blow the air cylinder will exert force on the electrode.

Whether the type of welding performed is the conventional resistance weld or delayed forge welding there will be some reduction in the thickness of the work during the welding process. The magnetic type resistance welder made a great contribution to this art insofar as it proved more responsive to the movement requirement than did the simple air cylinder arrangement employed in the past. The present arrangement improves on the conventional magnetic resistance welder due to the lost motion connection between the piston 42 and the piston rod 30 and due to the low inertia of the spindle as explained more fully hereinafter. Thus, when the piston is actuated to move the electrode down onto the work and to exert the initial pressure the system is no longer dependent upon the air cylinder for maintenance of this force during the follow-up action. When the electrode and spindle are moved they move free of the piston. Thus, when the piston has moved the electrode down onto the work, head 36 on piston rod 30 at the upper end of spindle 22 will butt against the surface 48 on the underside of piston 42. Now when the armature moves under either type of welding technique it may deliver its force to the spindle and move just the spindle and piston rod without having to pick up and carry along with it the piston assembly which, as mentioned above, has considerable inertia and has considerable frictional engagement with the cylinder 44. This can be seen in Figure 5 where the gap between head 36 and surface 48 is exaggerated. By thus reducing the resistance (friction and inertia) to motion, a faster response of the electrode is achieved. The initial force exerted by the air cylinder, as mentioned above, may run as high as 400 pounds and the present system can easily maintain that force throughout the welding cycle even though this cycle may be only $\frac{1}{120}$ second. Under the delayed forge technique, this supplementary force may actually be as high as 12,000 pounds (this is estimated since it is extremely difficult to measure such a force of such short duration). The order of magnitude of movement of the spindle during the welding process will seldom rise above $\frac{1}{16}$ of an inch. This is not a large amount of movement, but on the other hand, when the very short duration of the welding cycle is considered it will be appreciated that the system must be freed of inertia and friction wherever possible in order to achieve the fastest response possible.

The description above has shown how the ram inertia is eliminated and has described only briefly the structural features which permit a great reduction in the spindle inertia. In the interest of low inertia the mass must be kept low and the long spindle 22 is quite small in diameter. The spindle is loaded as high as 400 pounds by the ram and this load acts through the entire spindle length. Much greater loads are encountered in the spindle below the adjusting nut (where the magnetic force is delivered). Such forces as act on the spindle subject the spindle to column action which tends to bend the spindle which would then tend to bind in the bearings and increase the frictional resistance to spindle movement. The column action is effectively overcome by the spaced bearing assemblies 20, 28. Each bearing assembly is a linear or multiple row ball bearing assembly which gives the spindle support over a considerable length with minimal friction.

Heretofore, the armature has been slidable on and journalled on the spindle upon which the adjusting nut is mounted. This required a considerable spindle thickness to achieve stability of armature mounting free of canting. To reduce the mass we employ a small diameter spindle upon which the adjusting nut is threaded and having a sleeve 70 projecting from the nut with its upper end journalled on the spindle at 71. The sleeve length is sufficient to provide for all necessary movement of armature 65 which is provided with bearing 68 fitting on sleeve 70. The upper end of the sleeve (journalled at 71 on the spindle) is remote enough from the nut 72 to permit complete range of adjustment of the nut (and, hence, the armature).

To avoid increasing the length of the spindle as a consequence of this type construction the upper end of sleeve 70 also serves to journal the lower end of threaded sleeve 77 upon which the D.C. magnet adjusting nut 76 and its lock nut 78 are mounted. Thus sleeve 77 telescopes over sleeve 70 to hold the spindle length to a minimum while retaining full adjustment of the D.C. magnet.

With these structural features permitting a low mass spindle to be used while retaining adequate bearing for the armature and insuring free spindle motion without bending by use of the linear ball bearings the full potential of the Wakeley invention may be realized. As a result of the present invention and the Wakeley invention mechanical spindle movement now is fast enough to utilize the potential of the present electrical controls and operating cycles of $\frac{1}{120}$ or even $\frac{1}{240}$ of a second are possible while achieving better welds than heretofore. Throughout this description the magnetic circuit has been described as being in series with the welding circuit so the supplementary force is simultaneous with the welding current or delayed as in the forge action described. There may be instances when the supplementary force is desired at even a different time but when the present invention is still of importance. Therefore, the present invention is not to be construed as limited to the series circuit arrangement described.

It will be appreciated that the forge action may be optional in a welding machine. For this reason the present invention is not to be considered as limited to use with this feature. Nor is this invention limited to use in combination with the air cylinder arrangement since other arrangements may profitably be used for moving the spindle to and from the work. Similarly there may be other arrangements for imparting this supplementary force to the spindle. With these thoughts in mind, it will be appreciated that the present invention is to be limited only by the scope of the claims and not by the scope of the drawings and description.

We claim:

1. A resistance welding machine comprising, a frame, a fixed electrode on the frame, a spindle mounted in the frame for longitudinal reciprocating movement in a vertical direction, an electrode carried by the spindle, a portion of the spindle being threaded with the spindle portion above the threaded portion having a reduced diameter, a stop nut threaded on the spindle and having a sleeve extending upwardly therefrom with the upper end of the sleeve having an inwardly projecting shoulder journaled on the reduced diameter portion of the spindle, an armature slidably mounted on the sleeve, a magnet fixed on the frame below the armature to exert an attractive force on the armature, said stop nut being adjustable to vary the distance between the magnet and the armature.

2. A welding machine according to claim 1 in which the spindle is journalled in the frame in vertically spaced bearing assemblies, each assembly including multiple row ball bearings to provide lateral support to the spindle.

3. A resistance welding machine comprising, a frame, a fixed electrode in the frame, a spindle mounted in the frame for longitudinal reciprocating movement in a vertical direction, an electrode carried by the spindle, a portion of the spindle being threaded, a stop nut threaded on the spindle and having a sleeve extending upwardly therefrom, an armature slidably mounted on the sleeve, a magnet fixed on the frame below the armature to exert an attractive force on the armature, said stop nut being adjustable to vary the distance between the magnet and the armature, an upper magnet movably mounted on the frame above the armature, the frame including a sleeve around the spindle and telescoping over the upper end of the nut sleeve, the exterior of the frame sleeve having threads upon which an adjusting nut is mounted, the upper magnet resting on said adjusting nut.

4. A welding machine according to claim 3 in which the frame sleeve mounts therewithin a bearing assembly for the upper end of the spindle.

5. A welding machine comprising, a frame, an electrode fixed in the lower portion of the frame, a long slender spindle mounted in the frame for reciprocating longitudinal movement relative to the fixed electrode, a movable electrode carried by the spindle, a magnet fixed on the frame, an armature mounted on the spindle and adapted to be attracted by the magnet, the upper and lower portions of the spindle each being journalled in a multiple row ball bearing assembly giving the spindle great lateral support with a minimum of frictional resistance to movement said armature being connected to the spindle by means of a nut threaded on the spindle, said nut having a sleeve projecting upwardly therefrom, the spindle above the threaded portion being of reduced diameter, the sleeve surrounding the reduced diameter portion of the spindle and being spaced therefrom with its upper end journaled on the spindle, the armature being movable on said sleeve.

6. A welding machine comprising, a frame, an electrode fixed in the lower portion of the frame, a long slender spindle mounted in the frame for reciprocating longitudinal movement relative to the fixed electrode, a movable electrode carried by the spindle, a magnet fixed on the frame, an armature mounted on the spindle and adapted to be attracted by the magnet, the upper and lower portions of the spindle each being journaled in a multiple row ball bearing assembly giving the spindle great lateral support with a minimum of frictional resistance to movement, the armature being connected to the spindle by means of a nut threaded on the spindle, said nut having a sleeve projecting upwardly therefrom, the armature being movable on said sleeve, the upper bearing assembly being mounted in a sleeve fixed to the frame, the lower end of the fixed sleeve telescoping over the upper end of the nut sleeve, a nut threaded on the fixed sleeve, and an upper magnet resting on the fixed sleeve nut.

7. A welding machine according to claim 6 in which the upper end of the nut sleeve is journalled on the spindle.

8. In a welding machine of the type including a frame having a fixed electrode and a movable electrode carried by a reciprocable spindle, the spindle being movable by means which apply the initial pressure to the movable electrode, the combination of magnetic means for imparting a delayed forge action to the spindle, said magnetic means including a fixed magnet carried by the frame, an armature carried in the spindle and attracted by the magnet in a direction increasing the force on the spindle, a second magnet carried by the frame to exert a force on the magnet in opposition to the first magnet, stop means adjustably mounted on the spindle and providing a bearing surface for the armature of greater diameter than the spindle, the second magnet being operative to lift the armature from the stop and being overcome by the first magnet whereby the armature delivers a drop forge blow to the stop, on the spindle, the armature having a non-rotary, linear action on the bearing surface.

9. The combination according to claim 8 in which the stop means is threadably mounted on the spindle and includes a sleeve portion extending over the threads, the armature being slidable on the sleeve portion, the unthreaded end of the sleeve portion bearing directly on the spindle.

References Cited in the file of this patent

UNITED STATES PATENTS

| | | |
|---|---|---|
| 470,651 | Alford | Mar. 15, 1892 |
| 1,756,205 | Merrick | Apr. 29, 1930 |
| 2,567,864 | Becker | Sept. 11, 1951 |
| 2,650,977 | Welch | Sept. 1, 1953 |
| 2,689,295 | Goldner | Sept. 14, 1954 |
| 2,776,362 | Welch | Jan. 1, 1957 |
| 2,810,062 | Kaunitz | Oct. 15, 1957 |
| 2,892,068 | Park | June 23, 1959 |
| 2,905,804 | Wakeley | Sept. 22, 1959 |

OTHER REFERENCES

"Welding Journal" (Funk) June 1957. Pages 576–582 relied on.